(12) United States Patent
Kurian et al.

(10) Patent No.: US 11,797,388 B1
(45) Date of Patent: Oct. 24, 2023

(54) SYSTEMS AND METHODS FOR LOSSLESS NETWORK RESTORATION AND SYNCING

(71) Applicant: Bank of America Corporation, Charlotte, NC (US)

(72) Inventors: Manu Kurian, Dallas, TX (US); George Albero, Charlotte, NC (US); William August Stahlhut, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/859,293

(22) Filed: Jul. 7, 2022

(51) Int. Cl.
*G06F 11/14* (2006.01)
*G06F 11/26* (2006.01)
*G06F 11/07* (2006.01)
*G06F 11/20* (2006.01)
*G06F 11/16* (2006.01)
*G06F 11/22* (2006.01)

(52) U.S. Cl.
CPC ...... *G06F 11/1415* (2013.01); *G06F 11/0754* (2013.01); *G06F 11/0793* (2013.01); *G06F 11/142* (2013.01); *G06F 11/1458* (2013.01); *G06F 11/1658* (2013.01); *G06F 11/2028* (2013.01); *G06F 11/2033* (2013.01); *G06F 11/2082* (2013.01); *G06F 11/2289* (2013.01); *G06F 11/261* (2013.01); *G06F 2201/805* (2013.01)

(58) Field of Classification Search
CPC ............. G06F 11/1415; G06F 11/0754; G06F 11/0793; G06F 11/142; G06F 11/1458; G06F 11/1658; G06F 11/2028; G06F 11/2033; G06F 11/2082; G06F 11/2289; G06F 11/261; G06F 2201/805
See application file for complete search history.

(56) References Cited

U.S. PATENT DOCUMENTS

| | | | |
|---|---|---|---|
| 10,503,612 B1 * | 12/2019 | Wang | G06F 11/2023 |
| 11,200,045 B1 * | 12/2021 | Moyal | G06F 11/3442 |
| 11,360,861 B1 * | 6/2022 | Bissmeyer | G06F 11/2097 |
| 11,403,000 B1 * | 8/2022 | Barker, Jr. | G06F 3/0664 |
| 2016/0092343 A1 * | 3/2016 | Chhatwal | G06F 11/368 |
| | | | 717/124 |
| 2018/0101374 A1 * | 4/2018 | Chittigala | H04L 67/34 |
| 2020/0257539 A1 * | 8/2020 | Borlick | G06N 20/00 |

(Continued)

*Primary Examiner* — Bryce P Bonzo
*Assistant Examiner* — Michael Xu
(74) *Attorney, Agent, or Firm* — Weiss & Arons LLP

(57) ABSTRACT

Systems and methods for lossless restoration of a digital system are provided. A method may include creating a digital twin of the digital system. Creating the digital twin may include constructing a digital model that replicates hardware and software components and performance metrics of the digital system. The components and the performance metrics may be detected via a plurality of edge devices. The digital model may be configured to be run on a processor to simulate performance of the digital system. The method may include receiving an indication that the digital system is disconnected from a central server, syncing the digital twin with the digital system while the digital system is disconnected from the central server, and, in response to an indication that the digital system has reconnected with the central server, syncing the central server with the digital twin.

16 Claims, 6 Drawing Sheets

(56) References Cited

U.S. PATENT DOCUMENTS

| | | | | |
|---|---|---|---|---|
| 2020/0310394 | A1* | 10/2020 | Wouhaybi | H04L 67/125 |
| 2020/0314191 | A1* | 10/2020 | Madhavan | H04L 41/0853 |
| 2021/0157701 | A1* | 5/2021 | Goel | H05K 7/1487 |
| 2021/0314365 | A1* | 10/2021 | Smith | G06F 11/3006 |
| 2021/0374016 | A1* | 12/2021 | Bangalore | G06F 11/2097 |
| 2022/0163953 | A1* | 5/2022 | Lutz | G05B 19/41865 |
| 2022/0404800 | A1* | 12/2022 | Amaro, Jr | G05B 19/4155 |
| 2022/0404811 | A1* | 12/2022 | Amaro, Jr. | G05B 19/41835 |
| 2023/0021195 | A1* | 1/2023 | Yang | G06F 11/1423 |
| 2023/0204653 | A1* | 6/2023 | Khalil | G06F 11/3013 |
| | | | | 324/763.01 |

* cited by examiner

SYSTEMS AND METHODS FOR LOSSLESS NETWORK RESTORATION AND SYNCING

FIELD OF TECHNOLOGY

Aspects of the disclosure relate to digital systems. Specifically, aspects of the disclosure relate to apparatus and methods for lossless restoration of disconnected digital systems.

BACKGROUND OF THE DISCLOSURE

Digital systems play an integral role in the operations of nearly every enterprise across the globe. Large or small, enterprises rely on digital systems at all phases of their workflows. From communications and tracking to processing and record keeping, digital systems are the backbone of modern enterprises.

One critical weakness inherent in the reliance on digital systems may arise in a situation where the digital systems rely on a connection to a principle, or central, server. In these situations, the enterprises may be vulnerable to a loss of connection to the central server. This may occur due to a malfunction with the connective elements, or an external factor such as a natural disaster that may disrupt the connectivity. A loss of connection to the central server may prevent the digital system from effectuating accurate updates and data provisioning vis-à-vis the central server.

It would be desirable, therefore, to provide systems and methods for lossless restoration of a digital system.

SUMMARY OF THE DISCLOSURE

Aspects of the disclosure relate to apparatus and methods for lossless restoration of a digital system. A platform is provided which may include a processor, a non-transitory memory, and computer-executable instructions that run on the processor and may be configured to cause the processor to execute features of the apparatus and/or steps of the method.

The platform may be configured to create a digital twin of the digital system. To create the digital twin, the platform may be configured to store a list of core hardware and software components of the digital system in a catalog on a server. The platform may also be configured to detect, via a plurality of edge sensors, secondary hardware and software components of the digital system, as well as performance metrics of the core and secondary hardware and software components of the digital system.

The platform may be configured to store a list of the secondary hardware and software components and the performance metrics in the catalog on the server. The platform may be configured to construct a digital model to be the digital twin. The digital model may replicate the core and secondary hardware and software components and the performance metrics of the digital system that are stored in the catalog. The digital model may be configured to be run on the processor to simulate performance of the digital system.

The platform may be configured to receive an indication that the digital system is disconnected from a central server. The platform may be configured to sync the digital twin with the digital system while the digital system is disconnected from the central server. In response to an indication that the digital system has reconnected with the central server, the platform may be configured to sync the central server with the digital twin.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
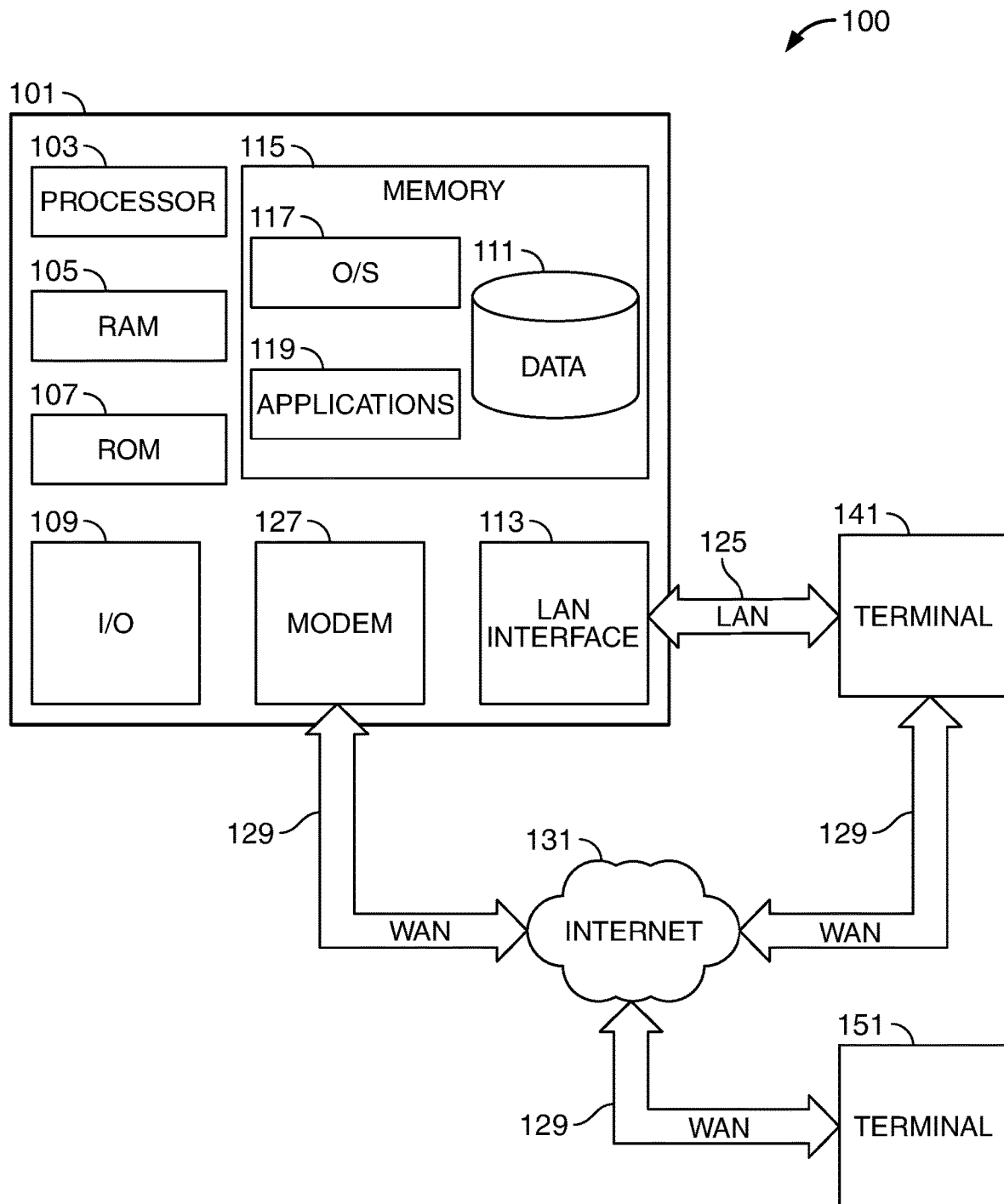
FIG. 1 shows an illustrative system in accordance with principles of the disclosure.

Aspects of the disclosure relate to apparatus and methods for lossless restoration of a digital system. A platform is provided which may include a processor, a non-transitory memory, and computer-executable instructions that run on the processor and may be configured to cause the processor to execute features of the apparatus and/or steps of the method.

The platform may be configured to create a digital twin of the digital system. A digital twin may generally be a virtual, software-based representation that serves as the real-time digital counterpart of a physical object, system, or process. In the case of a technology infrastructure a digital twin may be used to simulate, validate, and/or understand different applications and their dependencies when running different components such as processors, memory cores, cloud services, load balancers, web servers, database servers, network servers, etc.

To create the digital twin, the platform may be configured to store a list of core hardware and software components of the digital system in a catalog on a server. The platform may also be configured to detect, via a plurality of edge sensors, secondary hardware and software components of the digital system, as well as performance metrics of the core and secondary hardware and software components of the digital system.

The core hardware and software components may be components that are initially installed with the system. These may be 'off-the-shelf' components that may typically be provided as a list when a system is initiated. This list may form a foundational basis upon which the digital twin may be modeled. To construct an accurate digital twin, however, it may be advantageous to also model the rest of the components of the digital system, as well as utilize realistic performance metrics of all the components in the system. Modeling the digital twin based on a comprehensive list of system components plus realistic performance metrics may contribute to an accurate and effective model of the live digital system. The system may detect the rest of the components as well as the performance metrics with edge devices that measure and analyze the system as it actually performs at runtime. This may provide an up-to-date, accurate snapshot of the system that is gathered in a bottom-up manner based on actual system performance.

The platform may be configured to store a list of the secondary hardware and software components and the performance metrics in the catalog on the server. The platform may be configured to construct a digital model to be the digital twin. The digital model may replicate the core and secondary hardware and software components and the performance metrics of the digital system that are stored in the catalog. The digital model may be configured to be run on the processor to simulate performance of the digital system.

The platform may be configured to receive an indication that the digital system is disconnected from a central server. The platform may be configured to sync the digital twin with the digital system while the digital system is disconnected from the central server. In response to an indication that the digital system has reconnected with the central server, the platform may be configured to sync the central server with the digital twin. Syncing one system with another may include detecting any changes (e.g., changes in data or software contained in the system) in the first system and updating the other system based on the detected changes.

In some embodiments, the platform may be further configured to create a digital triplet. The digital triplet may be a duplicate of the digital twin. The digital triplet may be located together with the central server such that the digital triplet remains connected to the central server even when the digital system is disconnected from the central server. The digital twin may be located together with the digital system such that the digital twin remains connected to the digital system even when the digital system is disconnected from the central server. To sync the central server with the digital twin, the platform may be further configured to sync the digital triplet with the digital twin, and when the digital system is disconnected from the central server, sync the central server with the digital triplet.

In certain embodiments, the platform may be further configured to receive, as input, a potential modification to the digital system. The platform may be further configured to apply the potential modification to the digital twin and run the digital twin with the potential modification on the processor. In response to achieving an improvement in the simulated performance resulting from the running the digital twin with the potential modification, the platform may be further configured to apply the potential modification as a real modification to the digital system.

In some embodiments, the platform may include a machine-learning (ML) engine. The platform may be configured to run predictive analytics, using the ML engine, to generate a recommended potential modification. In response to the recommended potential modification exceeding a threshold probability score of achieving an improvement to the digital system, the platform may be configured to input the recommended potential modification as the potential modification.

In certain embodiments, the platform may be further configured to analyze the performance metrics, via the ML engine running predictive analytics, to identify a component of the digital system that exceeds a threshold likelihood of failing within a predetermined time period. The platform may be further configured to input a task of replacement of the component as the potential modification. The platform may be further configured to automatically submit an order for a replacement for the component to a supplier via an acquisition network.

In some embodiments, the platform may further include a graphical user interface (GUI) that may be accessible to a system administrator via a secure login. The platform may be further configured to display the digital twin as a three-dimensional rendition on the GUI. The three-dimensional rendition may, for example, represent the components of the digital system, and may display the components as an interconnected graph comprising nodes and edges. The nodes may represent components and the edges may represent associations between the components in the digital system. The GUI may also display performance metrics for each component (e.g., upon selection of a node or when a cursor hovers over a node). The GUI may be configured to receive potential modifications as input from the system administrator.

In certain embodiments, the platform may be further configured, in response to applying the potential modification as a real modification to the digital system, to measure, via the plurality of edge sensors, the performance metrics of the core and secondary hardware and software components of the modified digital system. The platform may also update the catalog according to the measuring, and update the digital twin according to the updated catalog. When the measured performance metrics indicate that the real modification to the digital system failed to achieve an actual improvement to the digital system, the platform may be further configured to undo the real modification.

In some embodiments, the performance metrics may include memory utilization, central processing unit (CPU) utilization, CPU heat level, disk swap, processing speed, and/or transmission latency.

In certain embodiments, the digital twin may be segmented into multiple tiers. Each tier may represent a different logical layer of the digital system. The different logical layers of the digital system may include a data layer, a data infrastructure layer, a security layer, and a container layer.

In some embodiments, the platform may be further configured, in response to a detection of an overloading of the digital system, to transform a portion of the digital twin into an actual component of the digital system.

The provided edge computing platform may collect different telemetry data such as CPU and memory usage, CPU temperature, disk swap (a swap disk/file or page file may include space used on a hard disk as RAM.), etc. from instrument or server levels and build a digital twin from the bottom up. The data may be collected from each server. The collection may be technically executed, for example, via AppDynamics or SPLUNK tool. The collection may feed the data into the digital twin object without affecting the servers themselves. The data being fed may model or simulate each of servers. The data can be fed in real time or in batch processes.

The digital twin may operate at different network levels. Levels may include a data level, a data infrastructure level, a security level, and/or any other suitable network level. The twin or, in some embodiments, a group of twins, may be built at multiple interest levels (e.g., a heuristic layer, container layer, etc.).

In some embodiments, data from the digital twin may be analyzed to identify performance optimization and fed back to the original server that generated the telemetry data creating an active feedback loop. This may allow usage of data from edge nodes to optimize systems in real time in the digital twin environment and push those changes back to the actual systems through automated configuration or code changes.

In certain embodiments, data from edge nodes may be used for predictive analytics to identify a system or component failures before they happen. The platform may send out alerts to order replacement parts in real time if an overload is predicted based on telemetry data from an edge node.

In some embodiments, the platform may use the telemetry data from edge node to create a "process level" digital twin. The twin may be used to spin up additional virtual servers and/or containers if a high load is detected. The load may then be distributed across the original and the new virtual server or container and it can be used as a load balancer. Additional virtual servers/containers may be dynamically created and collapsed depending on process usage.

Thus, systems and methods are provided for lossless restoration of a digital system. For example, at times a natural disaster can cause a physical branch location to become disconnected from a network. It would be desirable to use the disclosed digital twin system to restore and/or preserve data at the disconnected branch location.

The disclosed system can, in one illustrative scenario, be used at the branch level. For example, if there is an earthquake or hurricane, the digital twin may restore the data from the night before and continue to update when the server is not available. The digital twin may feed the information back to the server when it becomes available. Once the digital twin or triplet of the data and/or the disconnected data source comes back alive, it may update the primary server (alternatively referred to herein as a central server). The updating the information with the primary server may result in spinning up or down as required. The digital twin may, in this illustrative example, be able to update a primary server once the connection between the branch location and the primary server is restored.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to updating, storing, and/or syncing systems a digital network. The input/output module may also include one or more speakers for providing audio output and a video display device for providing textual, audio, audiovisual, and/or graphical output. The input and output may be related to computer application functionality. The input and output may be related to updating, storing, and/or syncing systems a digital network.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to updating, storing, and/or syncing systems a digital network.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
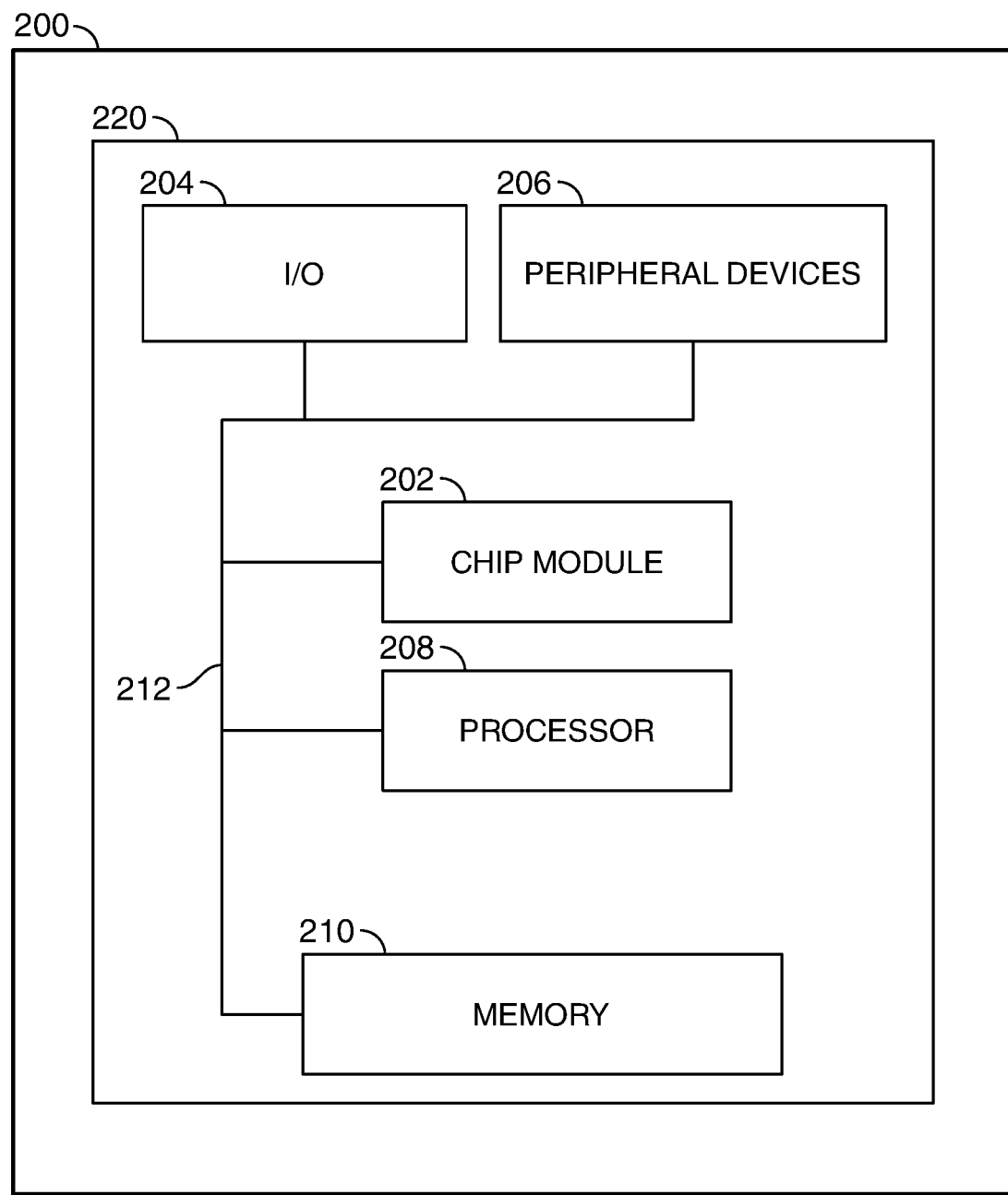
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
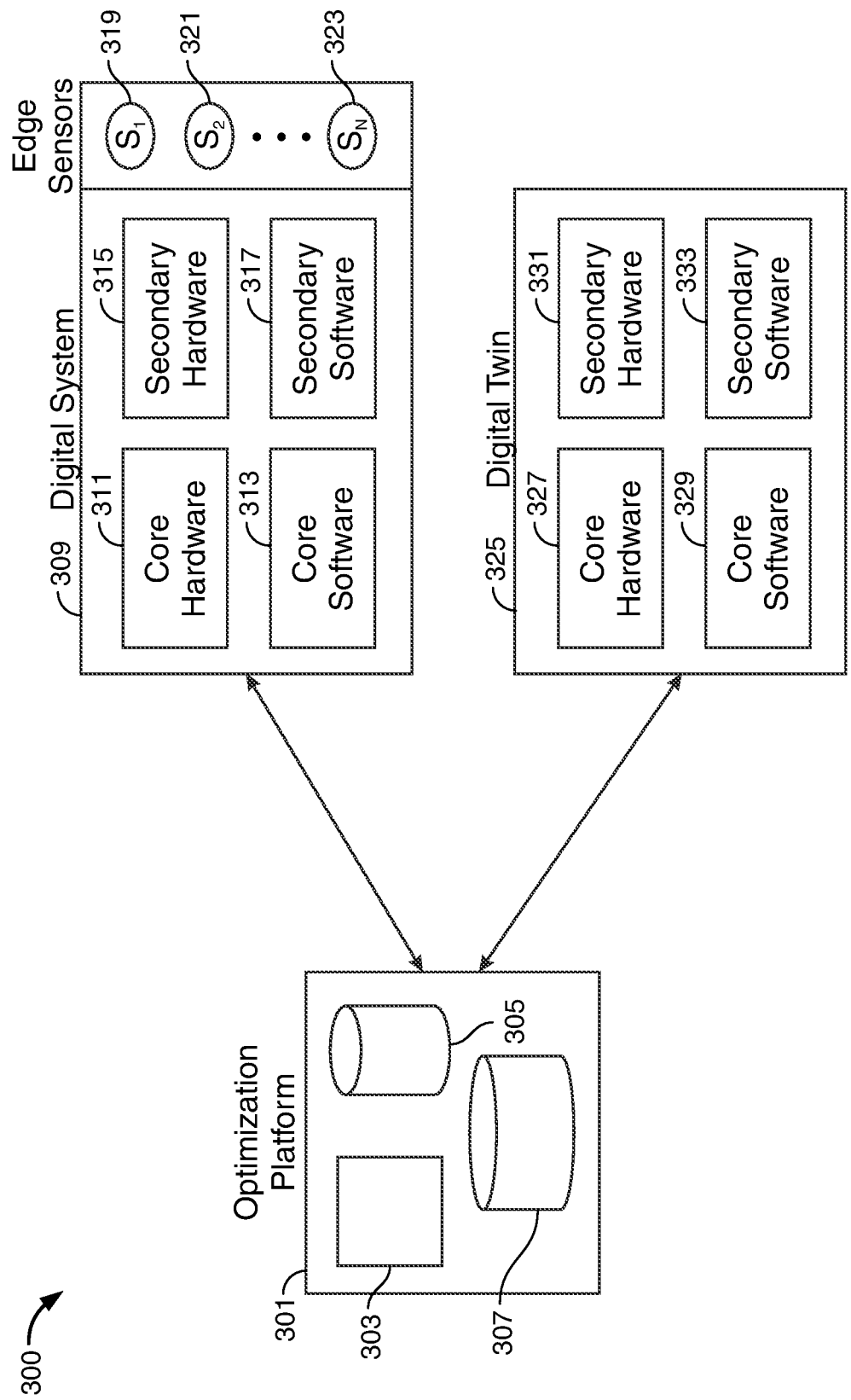
FIG. 3 shows an illustrative diagram in accordance with principles of the disclosure.

FIG. 3 shows illustrative diagram 300 in accordance with principles of the disclosure. Diagram 300 shows an example of a platform for updating and optimizing a digital system. Diagram 300 shows optimization platform 301. Optimization platform 301 includes processor 303, memory 305, and ML engine 307.

Diagram 300 also shows digital system 309. Digital system 309 includes core hardware 311, core software 313, secondary hardware 315, and secondary software 317. Diagram 300 also shows any suitable number of edge sensors 319-323. The edge sensors may include hardware and/or software sensors that may be installed proximal to the components of the digital system such that the edge sensors are able to detect the presence and/or performance metrics of the components. The edge sensors may, for example, include thermometers, cameras, software modules, or any other suitable detection sensor.

Diagram 300 also includes digital twin 325. Digital twin 325 may be completely software based. Digital twin 325 may include software that simulates components including core hardware 327, core software 329, secondary hardware 331, and secondary software 333. Core hardware 327, core software 329, secondary hardware 331, and secondary software 333 may, in turn, be designed to model actual components such as core hardware 311, core software 313, secondary hardware 315, and secondary software 317 of digital system 309. Optimization platform 301 may be configured to construct digital twin 325 based on data detected by edge sensors 319-323.

Figure 4:
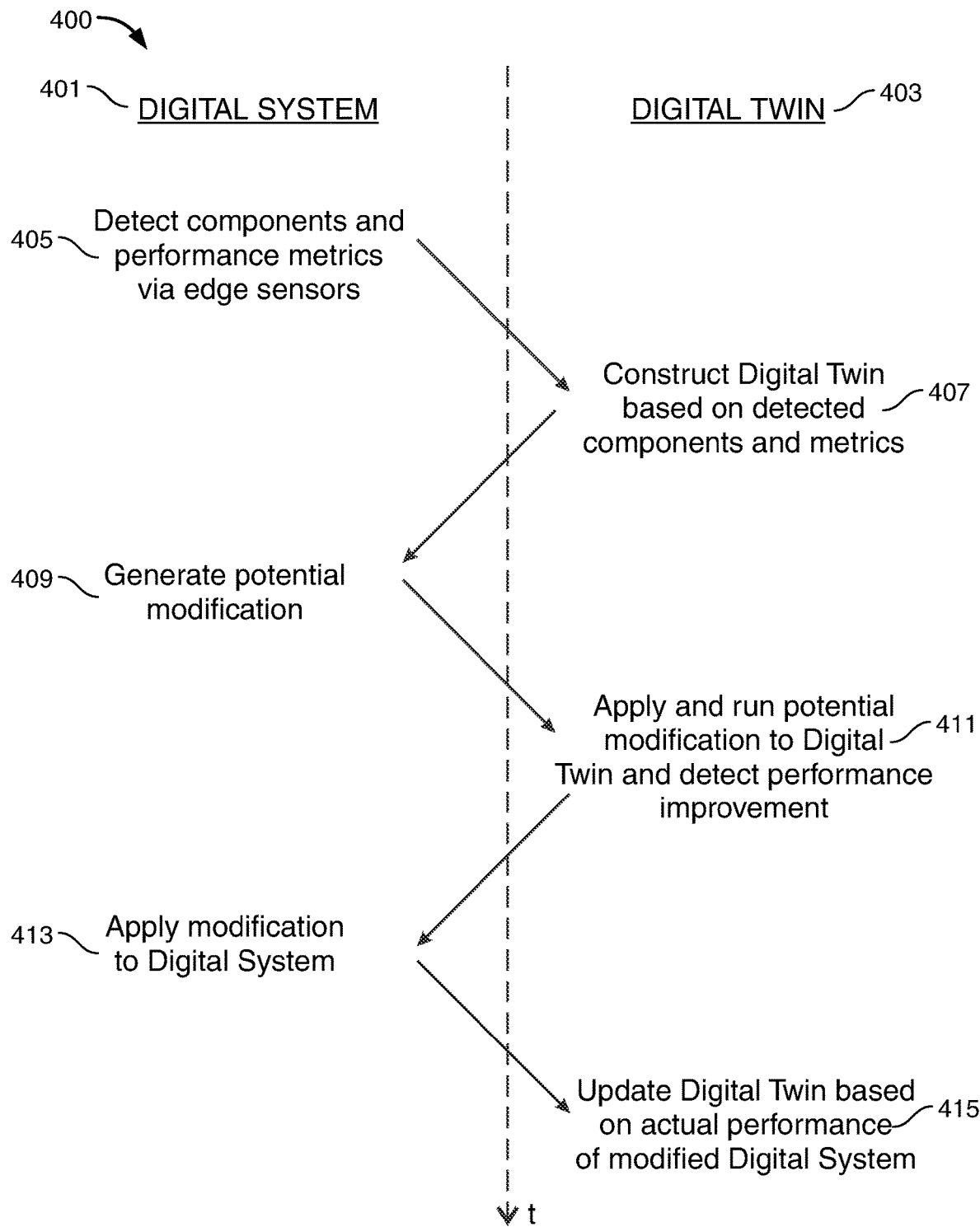
FIG. 4 shows another illustrative diagram in accordance with principles of the disclosure.

FIG. 4 shows illustrative diagram 400 in accordance with principles of the disclosure. Diagram 400 shows an illustrative process of updating and optimizing a digital system. The process shown in diagram 400 illustrates the dynamic feedback loop nature of the disclosed update and optimize process. Diagram 400 includes digital system column 401 and digital twin column 403. These columns are separated by a broken line to demarcate the elements of the process that occur on the actual digital system side from the elements that occur on the simulated digital twin side. Process steps are shown in descending chronological order.

The process may begin with step 405, where edge sensors detect components and performance metrics of the digital system. In response to this, at step 407, a digital twin may be constructed based on the detected components and metrics. At step 409, a potential modification may be generated. At step 411, the potential modification may be applied and run in the digital twin and a simulated performance improvement may be detected. In response to this, at step 413, the improvement may be applied to the digital system. Based on the actual performance resulting from the update, the digital twin may be updated at step 415.

Figure 5:
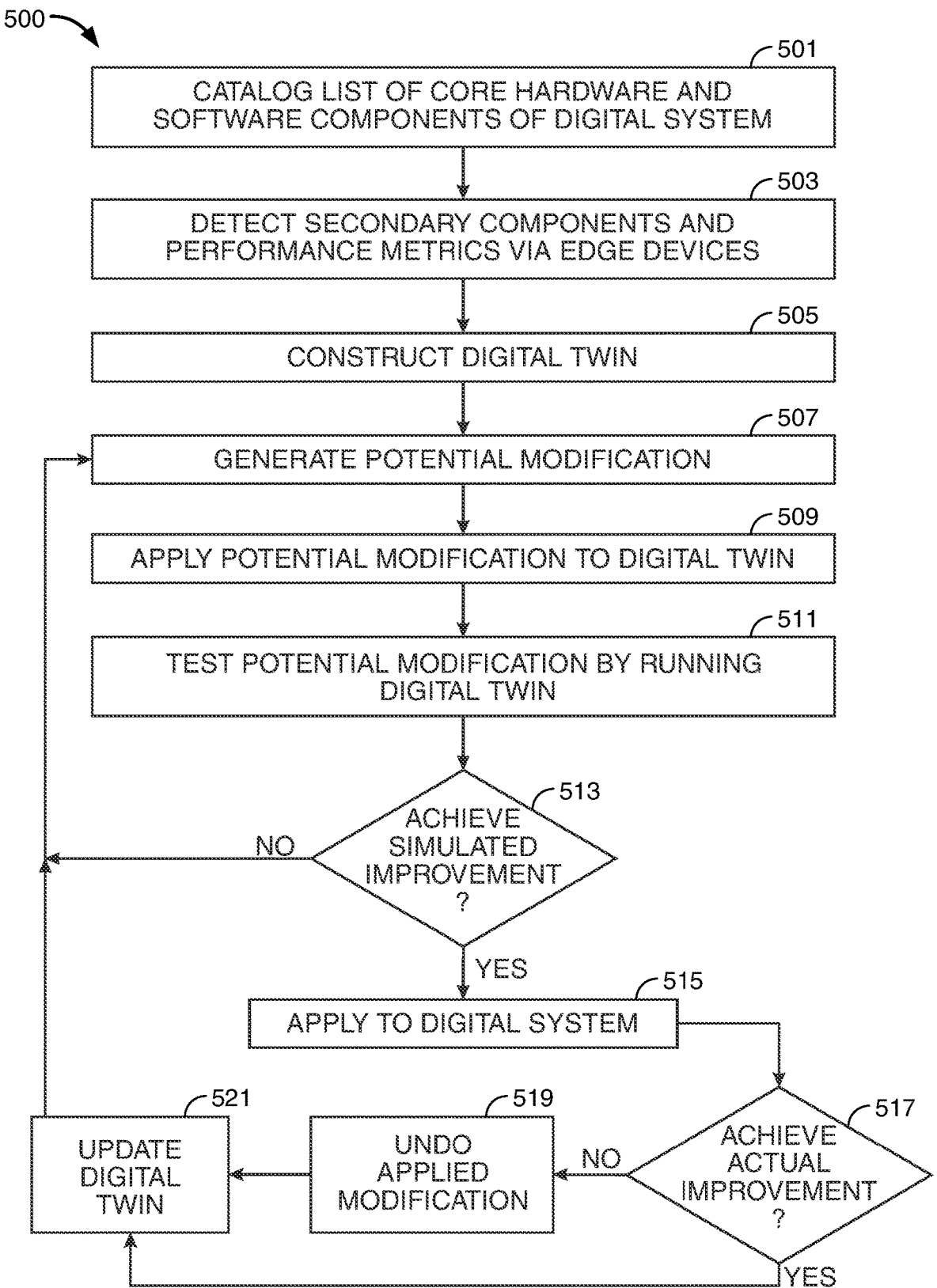
FIG. 5 shows an illustrative flowchart in accordance with principles of the disclosure.

FIG. 5 shows illustrative flowchart 500 in accordance with principles of the disclosure. Flowchart 500 may include steps of a method for updating and optimizing a digital system. At step 501, the method may include cataloging a list of sore hardware and software components of a digital system. At step 503, the method may include detecting secondary components and performance metrics of the digital system via edge devices installed at the digital system. At step 505, the method may include constructing a digital twin. At step 507, the method may include generating a potential modification. At step 509, the method may include applying the potential modification to the digital twin. At step 511, the method may include testing the potential modification by running a simulated operation or series of operations with the digital twin. At step 513, the method includes determining if a simulated improvement is achieved. If a simulated achievement has not been achieved, the method may circle back to step 507. If a simulated improvement has been achieved, the method may, at step 515, include applying the modification as an actual modification to the digital system. The modification may, for example, include an update, addition, or replacement of system hardware and/or software.

At step 517 the method may include determining if an actual improvement was achieved in the digital system as a result of the modification. If an actual improvement was not achieved, the method may include undoing the applied medication at step 519 and updating the digital twin at step 521 to reflect the actual change in performance that resulted from the applied modification. If an actual improvement was achieved at step 517, the method may include updating the digital twin at step 521 to reflect the actual performance improvement that resulted from the applied modification. The method may then circle back to step 507 and repeat the process for another potential modification.

Figure 6:
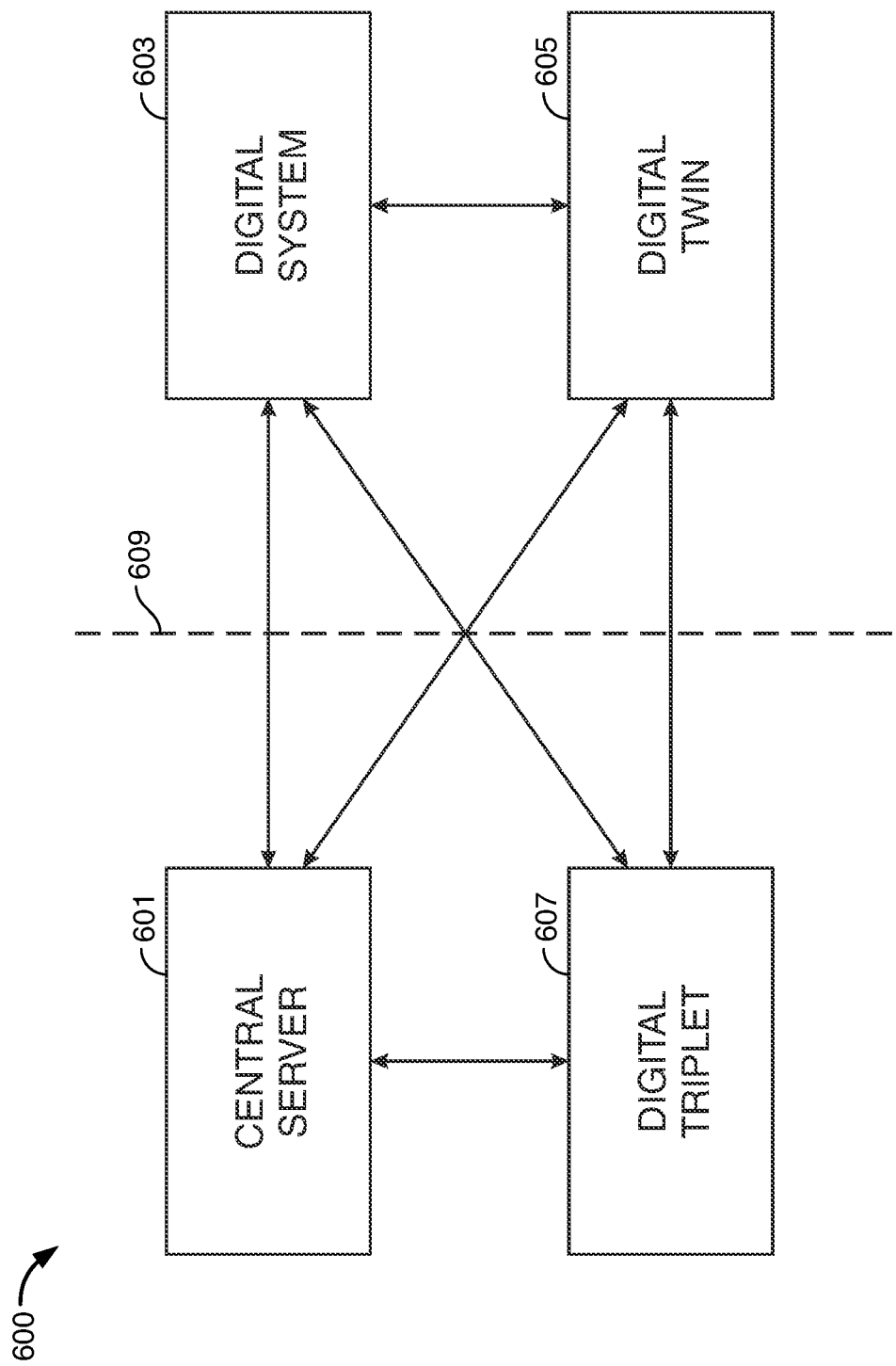
FIG. 6 shows an illustrative diagram in accordance with principles of the disclosure.

FIG. 6 shows illustrative diagram 600 in accordance with principles of the disclosure. Diagram 600 shows aspects of an example of a platform for lossless restoration of a digital system. Diagram 600 shows central server 601. Diagram 600 shows digital system 603. Diagram 600 shows digital twin 605. Diagram 600 shows digital triplet 607. Digital triplet 607 may be a duplicate of digital twin 605. Digital triplet 607 may be on the same side of network divide 609 as central server 601. Being on the same side of a network divide may include being located together such that digital triplet 607 remains connected to central server 601 even when digital system 603 is disconnected from the central server over the network. Syncing central server 601 with digital twin 605 may include syncing digital triplet 607 with digital twin 605 when there is sufficient network connectivity, and, when the network fails, syncing central server 601 with digital triplet 607.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for network restoration and syncing are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for lossless restoration of a digital system, the method comprising:
    creating a digital twin of the digital system, said creating the digital twin comprising:
        storing a list of core hardware and software components of the digital system in a catalog on a server;
        detecting, via a plurality of edge sensors:
            secondary hardware and software components of the digital system; and
            performance metrics of the core and secondary hardware and software components of the digital system;
        storing a list of the secondary hardware and software components and the performance metrics in the catalog on the server; and
        constructing a digital model to be the digital twin, wherein the digital model:
            replicates the core and secondary hardware and software components and the performance metrics of the digital system that are stored in the catalog; and
            is configured to be run on a processor to simulate performance of the digital system;
    receiving an indication that the digital system is disconnected from a central server;
    syncing the digital twin with the digital system while the digital system is disconnected from the central server;
    in response to an indication that the digital system has reconnected with the central server, syncing the central server with the digital twin;
    running predictive analytics, using a machine-learning (ML) engine, and generating a recommended potential modification, wherein the recommended potential modification exceeds a threshold probability score of achieving an improvement to the digital system;
    receiving, as input, the recommended potential modification as a potential modification to the digital system;
    applying the potential modification to the digital twin;
    running the digital twin with the potential modification on the processor; and
    in response to achieving an improvement in the simulated performance resulting from the running of the digital twin with the potential modification, applying the potential modification as a real modification to the digital system.

2. The method of claim 1 further comprising creating a digital triplet, wherein:
    the digital triplet is:
        a duplicate of the digital twin; and
        located together with the central server such that the digital triplet remains connected to the central server even when the digital system is disconnected from the central server; and
    the syncing the central server with the digital twin comprises:
        syncing the digital triplet with the digital twin; and
        when the digital system is disconnected from the central server, syncing the central server with the digital triplet.

3. The method of claim 1 further comprising:
    analyzing the performance metrics, via the machine-learning (ML) engine running predictive analytics, to identify a component of the digital system that exceeds a threshold likelihood of failing within a predetermined time period;
inputting, as the potential modification, replacement of the component; and
automatically submitting, to a supplier via an acquisition network, an order for a replacement for the component.

4. The method of claim 1 further comprising:
displaying the digital twin as a three-dimensional rendition on a graphical user interface (GUI) that is accessible to a system administrator via a secure login; and
configuring the GUI to receive potential modifications as input from the system administrator.

5. The method of claim 1 further comprising, in response to applying the potential modification as a real modification to the digital system:
measuring, via the plurality of edge sensors, the performance metrics of the core and secondary hardware and software components of the modified digital system;
updating the catalog according to the measuring;
updating the digital twin according to the updated catalog; and
when the measured performance metrics indicate that the real modification to the digital system failed to achieve an actual improvement to the digital system, the method further comprises undoing the real modification.

6. The method of claim 1 wherein the performance metrics comprise: memory utilization, central processing unit (CPU) utilization, CPU heat level, disk swap, processing speed, and transmission latency.

7. The method of claim 1 wherein the digital twin is segmented into a plurality of tiers, each tier representing a different logical layer of the digital system, and the different logical layers of the digital system comprise a data layer, a data infrastructure layer, a security layer, and a container layer.

8. The method of claim 1 further comprising, in response to a detection of an overloading of the digital system, transforming a portion of the digital twin into an actual component of the digital system.

9. A platform for lossless restoration of a digital system, the platform comprising a processor, a non-transitory memory, a machine-learning (ML) engine, and computer-executable instructions that run on the processor and are configured to cause the processor to:
create a digital twin of the digital system, wherein, to create the digital twin, the platform is configured to:
store a list of core hardware and software components of the digital system in a catalog on a server;
detect, via a plurality of edge sensors:
secondary hardware and software components of the digital system; and
performance metrics of the core and secondary hardware and software components of the digital system;
store a list of the secondary hardware and software components and the performance metrics in the catalog on the server; and
construct a digital model to be the digital twin, wherein the digital model:
replicates the core and secondary hardware and software components and the performance metrics of the digital system that are stored in the catalog; and
is configured to be run on the processor to simulate performance of the digital system;
receive an indication that the digital system is disconnected from a central server;
sync the digital twin with the digital system while the digital system is disconnected from the central server;
in response to an indication that the digital system has reconnected with the central server, sync the central server with the digital twin;
run predictive analytics, using the ML engine, to generate a recommended potential modification, wherein the recommended potential modification exceeds a threshold probability score of achieving an improvement to the digital system;
receive, as input, the recommended potential modification as a potential modification to the digital system;
apply the potential modification to the digital twin;
run the digital twin with the potential modification on the processor; and
in response to achieving an improvement in the simulated performance resulting from the running of the digital twin with the potential modification, apply the potential modification as a real modification to the digital system.

10. The platform of claim 9 further configured to create a digital triplet, wherein:
the digital triplet is:
a duplicate of the digital twin; and
located together with the central server such that the digital triplet remains connected to the central server even when the digital system is disconnected from the central server; and
to sync the central server with the digital twin, the platform is further configured to:
sync the digital triplet with the digital twin; and
when the digital system is disconnected from the central server, sync the central server with the digital triplet.

11. The platform of claim 9, wherein the platform is further configured to:
analyze the performance metrics, via the ML engine running predictive analytics, to identify a component of the digital system that exceeds a threshold likelihood of failing within a predetermined time period;
input, as the potential modification, replacement of the component; and
automatically submit, to a supplier via an acquisition network, an order for a replacement for the component.

12. The platform of claim 9 further comprising a graphical user interface (GUI) that is accessible to a system administrator via a secure login, wherein:
the platform is further configured to display the digital twin as a three-dimensional rendition on the GUI; and
the GUI is configured to receive potential modifications as input from the system administrator.

13. The platform of claim 9 wherein the platform is further configured, in response to applying the potential modification as a real modification to the digital system, to:
measure, via the plurality of edge sensors, the performance metrics of the core and secondary hardware and software components of the modified digital system;
update the catalog according to the measuring;
update the digital twin according to the updated catalog; and
when the measured performance metrics indicate that the real modification to the digital system failed to achieve an actual improvement to the digital system, the platform is further configured to undo the real modification.

14. The platform of claim 9 wherein the performance metrics comprise:
   memory utilization, central processing unit (CPU) utilization, CPU heat level, disk swap, processing speed, and transmission latency.

15. The platform of claim 9 wherein the digital twin is segmented into a plurality of tiers, each tier representing a different logical layer of the digital system, and the different logical layers of the digital system comprise a data layer, a data infrastructure layer, a security layer, and a container layer.

16. The platform of claim 9 wherein the platform is further configured, in response to a detection of an overloading of the digital system, to transform a portion of the digital twin into an actual component of the digital system.

\* \* \* \* \*